Sept. 22, 1959  W. H. DUKE  2,905,889
SERVO TACHOMETER
Filed Dec. 29, 1954  2 Sheets-Sheet 1

INVENTOR.
WILLIAM H. DUKE
BY
ATTORNEY

Sept. 22, 1959 W. H. DUKE 2,905,889
SERVO TACHOMETER

Filed Dec. 29, 1954 2 Sheets-Sheet 2

INVENTOR.
WILLIAM H. DUKE
BY
ATTORNEY 2,905,889
Patented Sept. 22, 1959

United States Patent Office

2,905,889
SERVO TACHOMETER

William H. Duke, Vestal, N.Y., assignor to International Business Machines Corporation, New York, N.Y., a corporation of New York Application December 29, 1954, Serial No. 478,473

5 Claims. (Cl. 324—70)

This invention is concerned with a tachometer. More specifically, the invention contemplates a D.C. servo tachometer for continuously indicating the speed of rotation of a given shaft.

It is an object of this invention to provide a pulse or step-actuated speed indicator which is driven to indicate the speed of revolution of a shaft in a continuous manner and for either direction of rotation.

Another object of this invention is to provide a tachometer that is especially applicable to a D.C. servo for measuring the speed of revolution of any given rotatable shaft, contained in such a system. Furthermore, this tachometer has the ability to indicate speeds in a very precise manner for either direction of rotation from full speed to standstill.

Briefly, the invention includes a tachometer comprising an input shaft, means for measuring a predetermined time interval beginning at a given rotational position of said input shaft, and including motive means for positioning an indicator to indicate the speed of rotation of said input shaft. The time interval measuring means also including means for supplying power to operate said motive means and to energize said time interval measuring means. The time interval measuring means also including means associated with said power supply means for causing the motive means to drive the indicator toward a new speed indication unless the indicator is then indicating correctly.

Specific embodiments of the invention are described in some detail below in accordance with applicable statutes and are illustrated in the drawings, in which.

Figure 1:
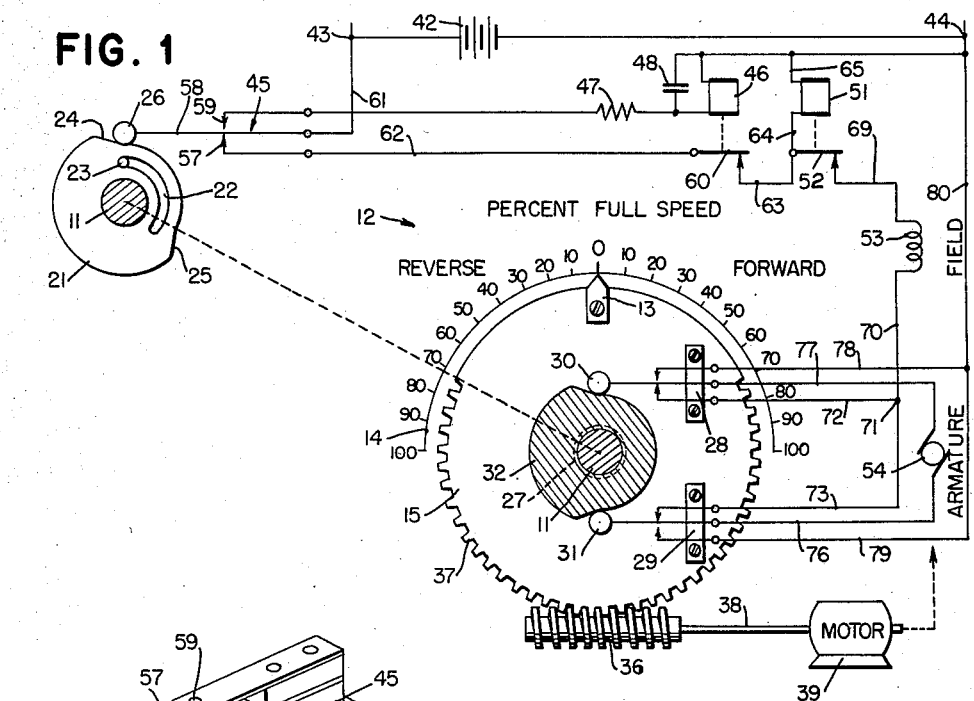
Fig. 1 shows a circuit diagram for the indicator motor control system including a schematic showing of certain mechanical elements.
Figure 2:
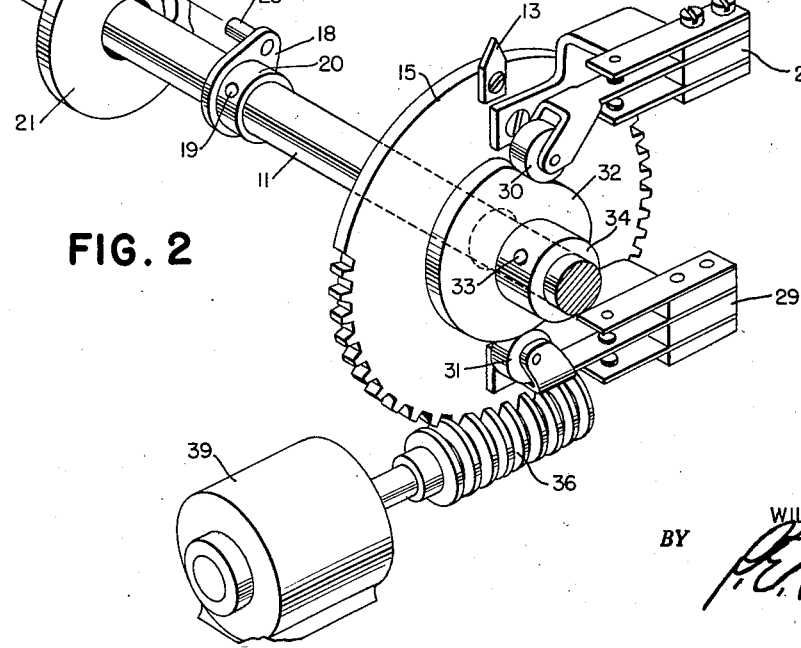
Fig. 2 is a perspective view illustrating the physical relationship between the major mechanical elements of the system.

A tachometer according to this invention is illustrated in Figs. 1 and 2, and measures the speed of rotation of a given shaft 11. It indicates the speed of rotation of shaft 11 by means of an indicator 12. The indicator 12 employs a pointer, or the like, 13 which moves relatively to index marks 14. The index marking may be calibrated in any given units, e.g., as illustrated, in percentage of full speed.

It will be noted that the indicator 12 is not illustrated in Fig. 2. This is because any desired arrangement may be made for coupling the pointer 13 to a disc 15. Such coupling is schematically illustrated in Fig. 1, as a direct attachment of the pointer 13 to the disc 15.

Referring to Fig. 2 it will be noted that there is a crank arm 18 securely attached to the shaft 11 for rotation therewith, e.g. by means of a pin 19, which passes through a flange or collar 20 that is integral with the crank arm 18. Pin 19 then passes into the shaft 11 for insuring no slippage or relative rotation between crank arm 18 and shaft 11. There is a cam disc 21 that is supported in a freely rotatable manner relative to the shaft 11. This cam disc 21 is driven in rotation in a positive manner with a predetermined amount of play, upon reversal, by means of an arcuate-shaped slot 22 that receives a short rod or pin 23 therein. Pin 23, in turn, is securely fastened to the crank arm 18. The slot 22 is designed in conjunction with the shape of the surface of cam 21 in such a manner that a cam follower 26 will ride down inclined surfaces 24 and 25 between the outer and inner concentric surfaces of the cam 21, to operate switch 45 at the same rotational position of the shaft 11, irrespective of which direction the shaft 11 rotates. The slopes of these inclined surfaces 24 and 25 are the same, i.e. these surfaces 24 and 25 each subtend an equal arc measured from the center of the shaft 11.

Conveniently located at some position longitudinally along the shaft 11 from cam 21 and its follower, there is the aforementioned disc 15 which is supported in a floating manner with its rotational axis coinciding with that of shaft 11. Disc 15 has a centrally located hole 27 therein such that the disc is freely rotatable relative to the shaft 11. Associated with the disc 15 there is a pair of switches 28 and 29 which are bodily attached to the disc 15 or otherwise move in unison therewith. Switches 28 and 29 have cam followers 30 and 31 respectively, for actuating the same. These followers 30 and 31 are spring-biased into contact with the surface of a cam 32 that is securely fastened to the shaft 11 for rotation therewith. Such fastening of cam 32 may be in any convenient manner, such as by means of a pin 33 passing through a collar 34 that is integral with the cam 32.

There is a worm 36 that meshes with gear teeth 37 on the periphery of the disc 15, for driving the disc in rotation. Integrally attached to the worm 36 for rotating the same is a shaft 38 of a motor 39. It will be observed that the mechanical relationship is such that the motor 39 will cause a rotation of the disc 15 around the shaft 11 via worm 36, and so vary the position of the pointer 13 for indicating changes in speed of revolution of the shaft 11.

In the electrical system there is a source of power supply, such as a battery 42 illustrated, that is connected to power supply terminals 43 and 44. The elements involved in the circuit include a switch 45 that is actuated by the follower 26. Other elements include a relay 46 that has a resistor 47 in series therewith and a condenser 48 in parallel. There is a second relay 51 that has a set of normally closed (i.e. when the relay is deenergized) contacts 52, actuated thereby. The circuit also includes a field winding 53 (which is that of the motor 39) and an armature 54 (which is likewise the armature of motor 39).

The operation of the tachometer in measuring speed of rotation of the shaft 11 is as follows: During each revolution of shaft 11, in either direction, there is a given fixed position of the shaft where switch 45 has its contacts shifted from the upper position to the lower position (when viewed as shown in the drawings). This position is where a center switch blade contact 58 of the switch 45 breaks contact with an upper contact 59 and makes contact with a lower contact 57 of the same switch 45. This is the beginning of a time interval which is predetermined and measured by the circuit constants of the relay 46 circuit. It is determined by the value of condenser 48, as well as the inductance involved, and the time delay in connection with relay 46. Thus, a time interval is commenced, once each revolution of the shaft 11, as the blade contact 58 of switch 45 breaks the contact with contact 59 and simultaneously, or shortly there-after, makes contact with the contact 57. This time interval is fixed as indicated above, the end thereof being normally closed when contacts 60 of the relay 46 drop out and close the circuit connected in series therewith. It will be noted that during this fixed time interval the shaft 11 will rotate an amount proportional to the speed of rotation of the shaft.

At the end of the fixed time interval, the closing of contacts 60 of relay 46, completes a circuit for energizing the relay 51. This circuit may be readily traced via a wire 61 leading from power supply terminal 43, to the blade contact 58 of switch 45, then continuing via contact 57 of the switch 45 and a wire 62 to the contacts 60 of relay 46 and continuing over a wire 63 to a wire 64 which leads to one side of the winding of relay 51. Then the other side of relay 51 is connected via a wire 65 and another wire 66 to the power input terminal 44. In this manner the relay 51 is energized and picks up its contacts 52. The interval of delay between energization of relay 51 and the opening of its normally closed contacts 52 may be varied, if desired, by well-known means.

The opening of contacts 52 breaks a circuit which had been completed at the end of the fixed time, i.e. when the contacts 60 closed. This circuit leads to the motor 39 in a reversible manner as clearly illustrated. It is pointed out that there are three conditions which may exist in this motor circuit when the pulse of energy is received, which pulse commenced with the closing of contacts 60 and ended with the opening of contacts 52. Which of these three conditions exists when any given pulse is received, depends upon the relative position of the cam 32 (which rotates with the shaft 11) and the followers 30 and 31, which actuate switches 28 and 29, respectively.

One condition is that when both followers 30 and 31 are on low dwell positions. This condition is illustrated in Fig. 1, and it means that the circuit for motor 39 is not completed through armature 54 so that no energy is received to cause the motor to rotate in either direction. This may be readily traced by following the circuit for supplying energy to the motor from the previously traced circuit for energizing relay 51 but branching at the wire 63 and then continuing over the now closed contacts 52 of relay 51 and on via a wire 69 to the field 53 of motor 39. Then continuing via a wire 70 to a junction 71. It will be observed that whichever way the circuit is continued from junction 71, a closed loop will be found which does not have any connection to the other side of the power supply source. Thus the motor 39 will not be energized to operate in either direction. This is the condition which exists during each revolution of shaft 11 when the indicator 12 is accurately indicating the speed of revolution of the shaft 11.

The second and third conditions which may exist in the motor circuit when the pulse of energy is received are the same in principle and only one need be described in detail. Either the follower 30 or the follower 31 will be on a high dwell while the other is on a low dwell of the cam 32, when one of these two conditions exists. Consequently the cam followers 30 and 31 will be in positions where switch 28 or switch 29 is in the opposite state from that illustrated in Fig. 1. Therefore, at this time the closing of the circuit for the motor 39 via contacts 52 will complete an energization circuit through the armature 54 with the direction of current flow being in one direction or the other while current through the field winding 53 remains in the same direction in either case. Therefore, for the duration of the pulse of energy, the motor 39 will be energized to run in a direction which will rotate the disc 15 and pointer 13 in a direction to cause the indication of the pointer 13 on the index 14 to approach the correct indication of the speed of rotation of the shaft 11. This will continue to occur once each revolution of the shaft 11 until the first condition is restored.

For example, assuming that the speed of shaft 11 has changed so that following the predetermined time interval after shaft 11 has passed through its definite rotative position, as determined by the cam 21 and associated switch 45, the above-described complete circuit for a pulse of energy or power from the terminal 43 will be completed via the now closed contacts 60 and 52 to one side of the field 53 of motor 39. Then, from the other side of the field 53 a circuit may be continued to junction 71 and on via a wire 72 or a wire 73, depending upon which of the cam followers 30 or 31 then is resting on its low dwell position on the cam 32. The circuit then is completed via either a wire 76 or a wire 77 to one side of the armature 54 of the motor 39. At the same time the circuit may be continued from the other side of the armature 54 via the other of the wires 76 or 77 to the contacts of switches 28 or 29 and then via a wire 78 or a wire 79 to a wire 80, which leads directly to the other power supply terminal 44. It will be remembered that the switches 28 and 29 which carry the cam followers 30 and 31 are rotated bodily around the shaft 11 with rotation of the disc 15.

It is to be noted that while switches 28 and 29 are illustrated as being a strap-type switch, it is preferred that these switches actually be a snap-action type of switch such as the type commonly known as a micro switch.

Figure 3:
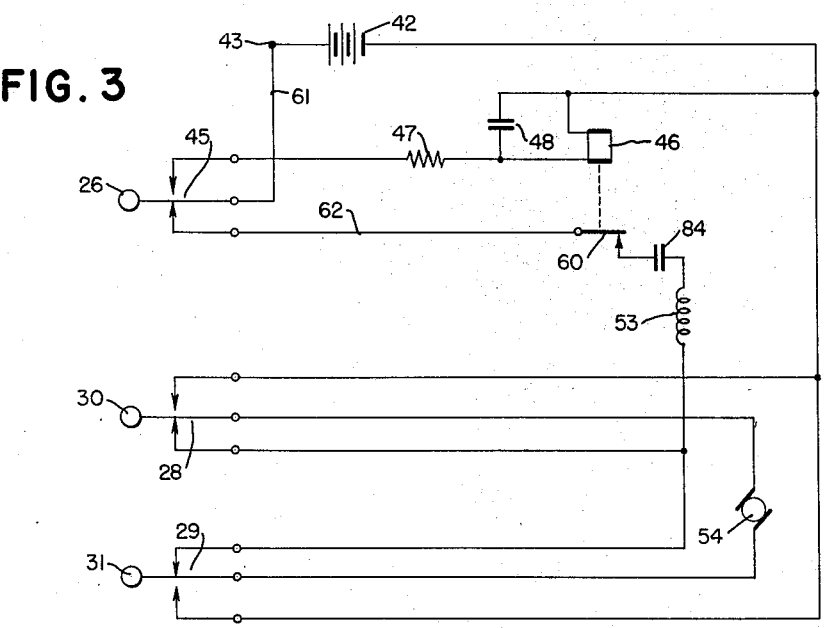
Fig. 3 is a circuit diagram illustrating a modification for part of the system.

In Fig. 3 there is illustrated a modification of part of the system according to this invention. The various elements which are unchanged have the same reference numbers. Only the electric circuit is shown. The relay 51 has been eliminated by employing a condenser 84, which is connected in series with the motor field 53 and the contacts 60 of the relay 46. It will be readily appreciated that the operation of the system will be the same as that described above in connection with Figs. 1 and 2, but the momentary closing of a circuit for energizing the motor 39 is now being effected by means of a condenser 84. This allows the passage of a given amount of energy, when used in a D.C. system, depending upon the capacity value of condenser 84.

Figure 4:
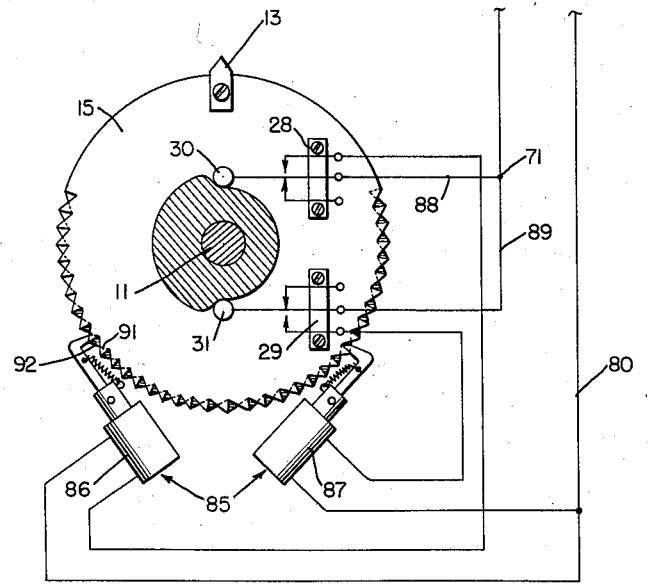
Fig. 4 is a schematic showing illustrating an alternative type of motor driving the speed indicator.

Another modification of a different portion of the system, according to this invention, is illustrated in Fig. 4 where the corresponding elements have the same reference numbers as those employed above, and where the system is illustrated as employing for the motive means to rotate disc 15, a ratchet-type motor 85. This motor may be a two-coil stepping relay, but is illustrated as two separate ratchet-and-coil elements 86 and 87. It will be observed that in this instance the gear teeth 37 on disc 15 (Figs. 1 and 2) must be altered to accommodate the ratchets 86 and 87 (Fig. 4). There are two separate sets of ratchet teeth 91 and 92 around the periphery of the disc 15. These are located side by side and the pawls for ratchets 87 and 86 are offset so as to engage the proper set of ratchet teeth. Therefore, each ratchet 86 or 87 will produce rotation of the disc 15 in a given direction. The circuit alteration which is necessary to employ a ratchet-type motor is clearly illustrated in Fig. 4. It will be observed that junction point 71 has leading therefrom a pair of wires 88 and 89 which are connected to the center or transfer contact of each of the switches 28 and 29, instead of to one of the outside contacts thereof, as previously described. The outer contacts of switches 28 and 29 are connected each to one side of the coil for ratchets 86 and 87, while the other side of each of these ratchet coils is connected in common to wire 80 which leads back to complete the circuit to power source 42. It will be clear that the operation of the system when a ratchet motor is employed will correspond to the operation of the system as previously described, and whenever the speed indication is not correct, there will be a short duration pulse of energy applied (one each revolution of the shaft 11) to one or the other ratchets 87 or 86 so as to step the disc 15 around in the proper direction to bring the indication of speed to the correct one.

It will be noted that various substitutions and combinations of the three embodiments illustrated might be made without changing the basic operation of a tachometer according to this invention.

While certain embodiments of this invention have been described in detail in accordance with the applicable statutes, this is not to be taken as in any way limiting the invention, but merely as being descriptive thereof.

It is claimed:

1. A tachometer comprising an input shaft, means for repeatedly measuring a predetermined time interval commencing at a given rotational position of said input shaft, speed indicator drive means having reversible energization circuits with a neutral condition where no energization is supplied to the indicator drive, means driven by said input shaft for determining the status of said energization circuits at the end of said predetermined time interval, and means for supplying a pulse of energy to said indicator drive means at the end of said predetermined time interval so that the indicator will be driven in one direction or the other or not at all depending upon the status determining means.

2. A tachometer comprising an input shaft, electrical means including a switch controlled by a cam driven by said input shaft for repeatedly measuring a predetermined time interval commencing at a given rotational position of said input shaft irrespective of the direction of rotation of the shaft, speed indicator drive means having reversible energization circuits with a neutral condition where no energization is supplied to the indicator drive, means driven by said input shaft for determining the status of said energization circuits at the end of said predetermined time interval, and means for supplying a pulse of energy to said indicator drive means at the end of said predetermined time interval so that the indicator will be driven in one direction or the other or not at all depending upon the status determining means.

3. A tachometer comprising an input shaft, electrical means including a switch controlled by a cam driven by said input shaft for repeatedly measuring a predetermined time interval commencing at a given rotational position of said input shaft irrespective of the direction of rotation of the shaft, speed indicator drive means having reversible energization circuits with a neutral condition where no energization is supplied to the indicator drive, a second cam directly connected to said input shaft, switch means controlled by said second cam for determining the status of said energization circuits at the end of said predetermined time interval, and means for supplying a pulse of energy to said indicator drive means at the end of said predetermined time interval so that the indicator will be driven in one direction or the other or not at all depending upon the status determining means.

4. A tachometer comprising an input shaft, a first cam having a slotted driven connection with said input shaft, a switch actuated by said first cam, a time delay circuit controlled by said switch for measuring a predetermined time interval commencing at a given rotational position of said input shaft and ending prior to one revolution thereof irrespective of the direction of rotation of the shaft, a second cam securely attached to said input shaft for rotation therewith, a pair of switches actuated by said second cam, a motor having a control circuit under control of said pair of switches, means for supporting said pair of switches, said supporting means being driven in rotation by said motor, means for supplying a short duration pulse of energization to said said motor control circuit commencing with the end of said predetermined time interval, and an indicator driven by said motor for indicating speed and direction of rotation of said input shaft.

5. A tachometer comprising a rotatable input shaft, electrical means for measuring a predetermined time interval beginning at a given rotational position of said input shaft, an indicator for indicating the speed of rotation of said input shaft, electrically operated drive means for positioning said indicator, circuits for supplying power to operate said drive means, means responsive to rotation of said input shaft for energizing said time interval measuring means, connections between said interval measuring means and said circuits which are neutral when said indicator is correctly indicating the speed of said shaft, and input shaft responsive means associated with said circuits for rendering effective said connections for causing said drive means to drive said indicator toward a new speed indication when said indicator is incorrectly indicating the speed of said shaft.

References Cited in the file of this patent

UNITED STATES PATENTS

| | | |
|---|---|---|
| 1,214,088 | Skinner | Jan. 30, 1917 |
| 2,070,623 | Satterlee | Feb. 16, 1937 |